Sept. 24, 1929.  J. F. MALONEY ET AL  1,729,115
WELL SCREEN
Filed March 15, 1927   2 Sheets-Sheet 1

INVENTOR.
Joe F. Maloney
Stephen P. Parish
BY Hardway Cathey
ATTORNEYS.

Sept. 24, 1929.  J. F. MALONEY ET AL  1,729,115
WELL SCREEN
Filed March 15, 1927   2 Sheets-Sheet 2
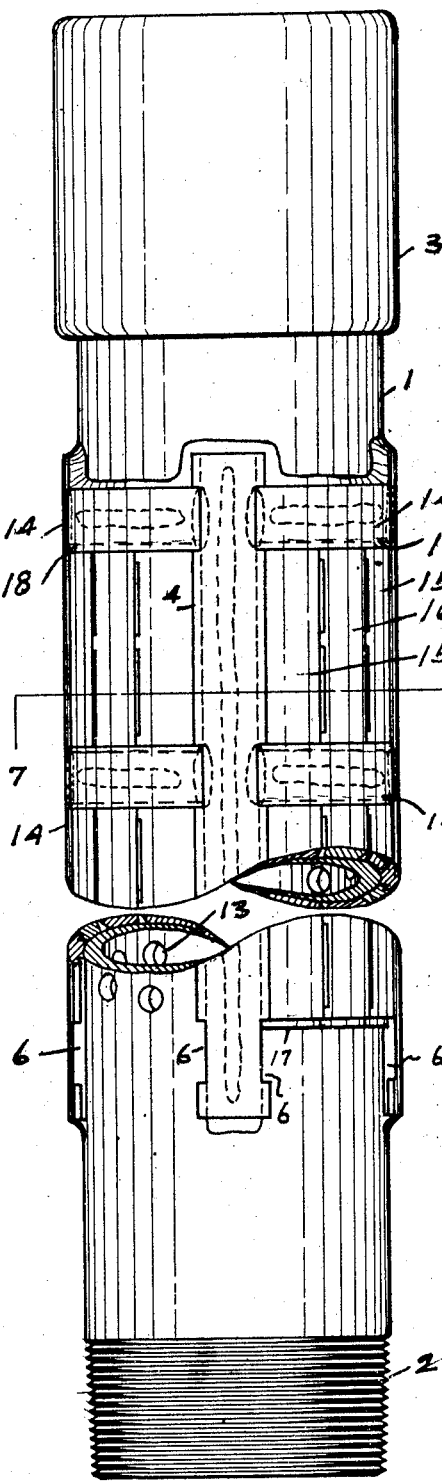
Fig. 6.
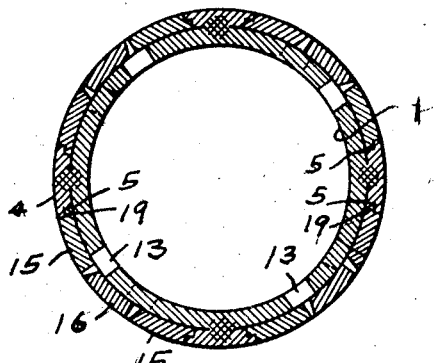
Fig. 7.
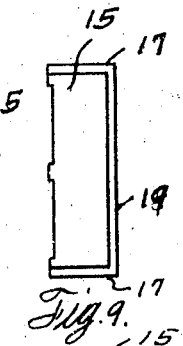
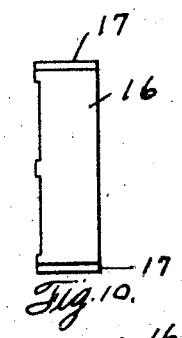
Fig. 8.  Fig. 9.  Fig. 10.
Fig. 11.  Fig. 12.
Fig. 13.  Fig. 14.
INVENTORS
Joe F. Maloney.
Stephen P. Fastish
BY
Hardway & Cathey
ATTORNEYS.

Patented Sept. 24, 1929

1,729,115

UNITED STATES PATENT OFFICE

JOE F. MALONEY AND STEPHEN P. FARISH, OF HOUSTON, TEXAS

WELL SCREEN

Application filed March 15, 1927. Serial No. 175,459.

This invention relates to new and useful improvements in a well screen.

One object of the invention is to provide a well screen comprising a perforated tubular support, such as a perforated pipe, and screening elements mounted thereon, in a novel manner and so secured to the pipe and to each other as to form a very durable screen with ample screening surface.

Another object of the invention is to provide, in a well screen, a novel type of screening element with novel means for securing the same to the perforated tubular support.

A further feature of the invention resides in a novel method of assembling the elements of a well screen.

With the above and other objects in view the invention has particular relation to certain novel features of construction, arrangement of parts and method of formation, an example of which is given in this specification and illustrated in the accompanying drawings, wherein:—

Figure 6 shows a side elevation of a joint, or section of screen showing another method of assembling the screening elements, or segments, with some of said elements removed.

Figure 7 shows a cross sectional view thereof, taken on the line 7—7 of Figure 6.

Figure 8 shows an edge view of a screening element employed in this form of screen.

Figures 9 and 10 show side views respectively of different types of screening elements employed in this form of screen.

Figure 1:
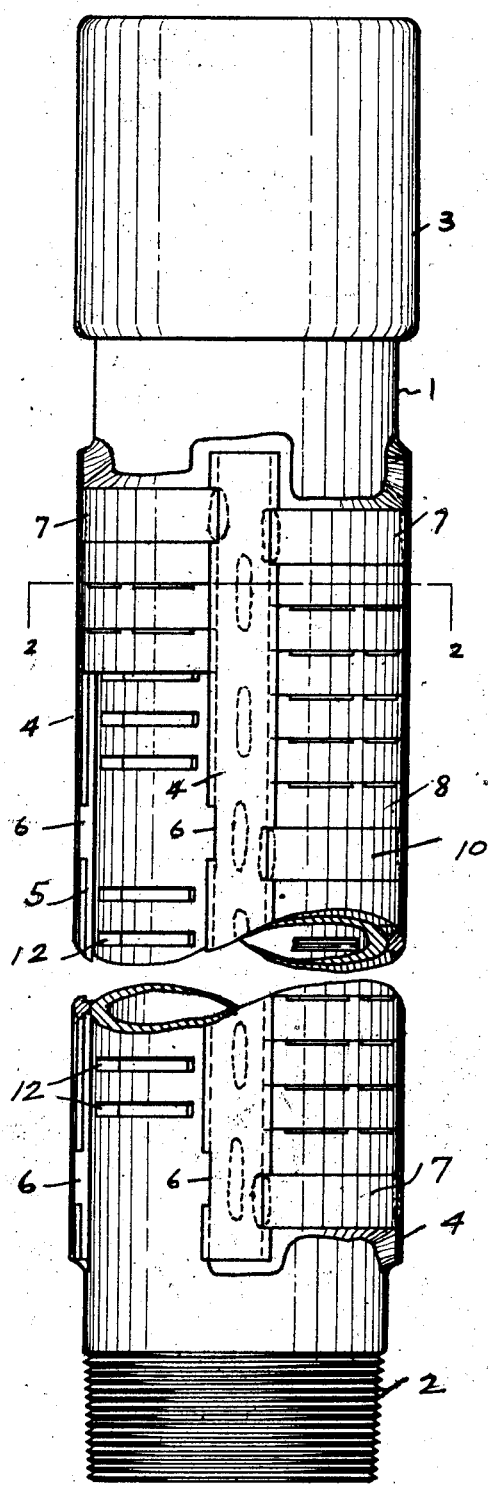
Figure 1 shows a side elevation of a joint or section of the screen, with some of the screening elements removed.
Figure 2:
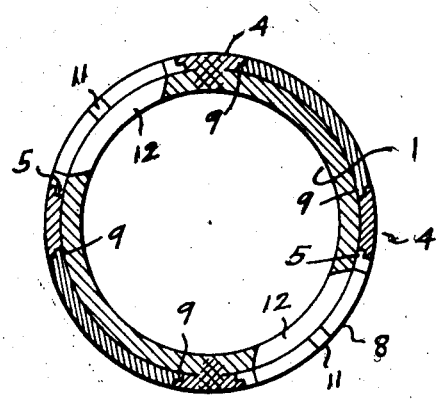
Figure 2 shows a cross sectional view thereof, taken on the line 2—2 of Figure 1.
Figure 3:
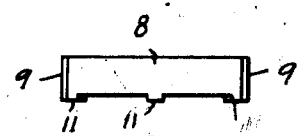
Figure 3 shows a side elevation of one of the screening elements, or segments.
Figures 4, 5:
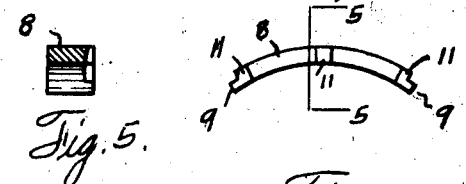
Figure 4 shows an edge view thereof.
Figure 5 shows a cross sectional view thereof taken on the line 5—5 of Figure 4.

Figures 11 and 12 show end views of the respective forms of elements shown in Figures 9 and 10, and Figures 13 and 14 show end and edge views respectively of segmental locking bands employed.

Referring now more particularly to the drawings, wherein like numerals of reference designate similar parts in each of the figures, the numeral 1 designates a tubular support, preferably a section of pipe. Each end of this section is threaded as at 2 to receive a connecting collar 3 by means of which a number of the sections may be connected together if desired.

A plurality of lengthwise bars, as 4 are secured to the outside of the section 1 and extend substantially from end to end of said section. These bars may be secured in place by welding their ends to the pipe section and by spot welding them to the pipe, at intervals along their length. The edges of these bars 4 are undercut forming facing grooves 5, 5, and the opposing edges of these respective bars have the pairs of opposing oblong notches 6, 6. The end pairs of notches 6 are provided to receive the ends of the arcuate band segments 7, which, when seated in said notches are welded therein, and said segments are also welded to the pipe section 1.

There are arcuate screening elements 8 whose ends are formed with offset tenons 9, 9, and these segments, or elements 8, are assembled into the structure of the screen, one at a time, by passing the tenons 9 thereof radially through the notches 6 and then moving the element 8 lengthwise along the pipe section, said tenons 9 moving in the grooves 5 until the screening element first inserted abuts against the band segment 7 and other screening elements may be similarly inserted in succession and moved along the grooves 5, each element inserted abutting against the preceding one until a screening surface is built up to the pair of notches 6, 6, through which said elements have been inserted. Another arcuate band segment, as 10, is then fitted to the pipe section 1, with its ends seated and welded in said notches 6 and said segment 10 may also be spot welded to the pipe section. The corresponding edge of each screening element has the spacing lugs 11 therein which hold the screening elements spaced a uniform distance apart to form slits between them and said edges are beveled inwardly so that said slits will widen inwardly so that they will not readily clog. It is to be here noted that the pipe section 1 is perforated, preferably before the bars 4 are secured thereto. In the form shown in Figure 1 these perforations are in the form of circumferential slots 12 and when the screening elements are assembled the slits between them will be located over the respective slots 12.

The work of building up the section 1, of the screen, may be continued, as above described, until the section is completed. The notches 6 cut in opposite edges of any bar 4 may be offset, or in staggered relation, if desired, so as not to unduly weaken said bars.

In the form shown in Figures 6 and 7 the pipe section 1 is shown having perforations 13, rather than slots 12, but it may be provided with slots if desired.

In this form the lengthwise bars 4 are secured to the pipe section, in the same manner as shown in Figure 1, and are of the same form, having their edges under cut to provide the grooves 5 and their facing edges have the pairs of opposing oblong notches 6. These pairs of notches are spaced apart, lengthwise of the pipe, and they are provided to receive the ends of the arcuate band segments 14, which are welded therein and said segments are also spot welded to the pipe section 1. In this form the screening elements 15, 16, extend lengthwise between the respective segments 14 and have the end tenons 17 which fit into the undercut grooves 18 in the adjacent edges of the segments 14. The screening elements 15 have a lengthwise marginal tenon 19 on one side which fits into the undercut groove 5, of the adjacent bar 4 and the element 16 is fitted between the screening elements 15, as shown in Figures 6 and 7. In assembling the screening elements 15, 15, 16, the segment 14, at one end thereof, is not welded into place until after said elements are assembled into proper relation with the segment 14 at the other end of them, and with the adjacent bars 4 and then said segment is welded in place and into interlocking relation with the adjacent end tenons 17. The screening elements 15 and 16 are suitably spaced apart by the marginal lugs, as 20, carried by them, thus forming slits between them, and their facing edges are suitably beveled inwardly so that said slits will widen inwardly to lessen the liability of their clogging.

What we claim is:

1. A well screen including a perforated pipe, bars secured on the outside of the pipe and spaced apart, the facing edges of said bars having pairs of opposing marginal notches, to permit the passage of the ends of screening elements therethrough, series of screening elements on the pipe between said bars, retaining elements between the bars and separating the corresponding series of screening elements, said retaining elements and bars locking the adjacent screening elements in assembled relation, the ends of said retaining elements being seated and secured in the corresponding notches, said screening elements having spaced lugs between them to hold them in spaced relation.

2. A well screen including a perforated pipe, bars secured on the pipe and spaced apart, the facing edges of said bars having pairs of opposing marginal notches, retaining elements whose respective ends are seated and secured in said notches, screening elements between and retained in assembled relation by the band retaining elements, said screening elements being of a length to permit the simultaneous passage of their ends through opposing notches.

3. A well screen including a perforated pipe, longitudinal bars secured on the pipe and spaced apart, the facing edges of said bars having pairs of opposing marginal notches, band segments whose respective ends are seated and secured in said notches, screening elements between and retained in assembled relation by the band segments and bars, said screening elements being adapted to simultaneously pass through opposing notches and having their ends secured underneath the corresponding bars.

4. A well screen including a perforated pipe, longitudinal bars secured on the outside of the pipe and spaced apart, the margins of said bars being undercut to form facing longitudinal grooves, the facing edges of said bars having opposing notches arranged in pairs, screening elements of a length to permit their ends to simultaneously pass through opposing notches, and elements whose ends are seated in said grooves thereby securing said elements on the pipe, arcuate segments secured on the pipe and whose ends are seated in said notches to retain said elements in assembled relation.

5. A well screen including a perforated pipe, bars secured on the outside of the pipe and spaced apart, the margins of said bars being undercut to form facing longitudinal grooves, the facing edges of said bars having opposing notches arranged in pairs, screening elements whose ends are formed to pass through opposing notches and seat in said grooves thereby securing said elements on the pipe, arcuate segments secured on the pipe and whose ends are seated in said notches to retain said elements in assembled relation and means for spacing said elements apart to form slits between them.

6. A well screen including a perforated pipe, longitudinal bars secured on the outside of the pipe and spaced apart, the margins of said bars having pairs of facing marginal notches, band segments whose ends are seated and secured in the notches of the respective pairs of notches, said bars and segments forming retaining elements, screening elements adapted to be passed through opposing notches, said elements being spaced apart and located between said retaining elements, some of said retaining elements having undercut grooves into which the adjacent ends of the screening elements are seated.

7. A well screen including a perforated pipe, longitudinal and circumferential retaining members secured on the outside of the pipe providing a plurality of substantially rectangular spaces for the reception of screening elements, screening elements in said spaces whose ends are clamped between the adjacent retaining members and the pipe, the facing edges of some of said retaining members having pairs of opposing marginal notches to permit the passage of the screening elements therethrough and the ends of other retaining members being seated and secured in said notches.

In testimony whereof we have signed our names to this specification.

JOE F. MALONEY.
STEPHEN P. FARISH.